Oct. 29, 1963     R. C. SABINS     3,108,939
PLATINUM PLUG-VALVE METAL ANODE FOR CATHODIC PROTECTION
Filed Feb. 14, 1958

INVENTOR.
ROLLAND C. SABINS

BY Fulwider, Mattingly
and Huntley    ATTORNEYS

United States Patent Office 3,108,939
Patented Oct. 29, 1963

1

3,108,939
PLATINUM PLUG-VALVE METAL ANODE
FOR CATHODIC PROTECTION
Rolland C. Sabins, 522 Catalina Blvd., San Diego, Calif.
Filed Feb. 14, 1958, Ser. No. 715,440
8 Claims. (Cl. 204—196)

The present invention relates to an electrolytic system and to an anode for such system. More particularly, the present invention is directed to an electrolytic system for preventing galvanic dissolution of cathodic material and is directed to an anode which is relatively inexpensive yet has the characteristics of expensive substance such as platinum.

In practicing the present invention, an extraneous source of D.C. current is impressed upon the system to increase the potential of the cathode to above its dissolution potential.

It is known that when an attempt is made to use a single body of some substances, such as lead, as an anode in a galvanic system employing for example sea water as the electrolyte, such substances become passive to the flow of current and therefore can function as an anode only during the period prior to the substance becoming passive. It is well known that some substances, such as platinum, are not readily dissolved in the commonly used acids or in weak electrolytes such as sea water.

I have discovered that by physically associating a relatively small piece of platinum with a mass of substance, such as lead, such mass remains sufficiently active so that the entire surface thereof, exposed to the electrolyte, functions anodically and that such substance ceases to dissolve after being coated by a compound including the substance and the ions of the electrolyte.

Further objects and advantages will be apparent from the following description, reference being had to the accompanying drawings wherein preferred embodiments of the invention are illustrated.

Figure 1:
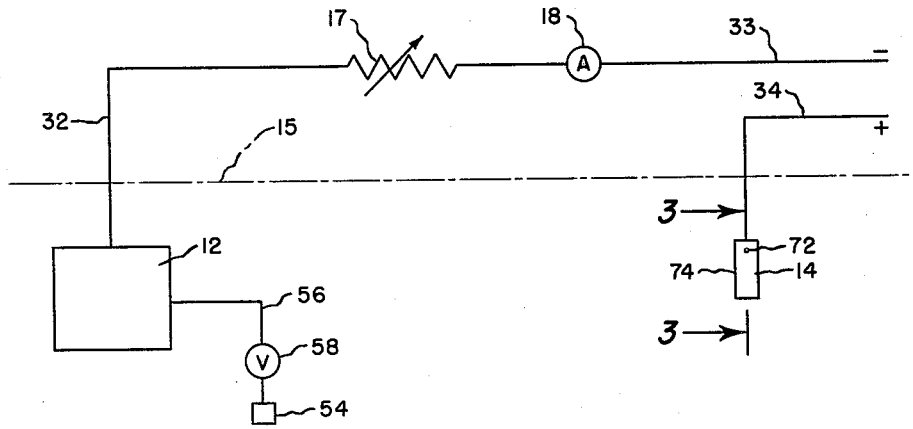
FIG. 1 is a diagrammatic view illustrating a galvanic system wherein my invention is employed.

Referring more in detail to the drawings and particularly FIG. 1, I have shown a cathode at 12, which may be any metal object or objects which is or are adapted to be polarized ind in which it is desirable to maintain a substantially uniform polarization of the entire surface which could be affected by galvanic action. Thus for example, the cathode may be the hull of a ship or the hull of an airplane, or it may be a metal pipe.

The anode is shown at 14 and will be described more in detail hereinafter.

The electrolyte may be any material in which ionization takes place, such as water or earth. For illustrative purposes, the cathode is shown as embedded in an electrolyte, for example sea water, the level of which is indicated by the dot and dash line 15; here the cathode may be the hull of a ship.

The cathode 12, anode 14 and the electrolyte are connected in galvanic relationship through a circuit including a source of D.C. current. This source of D.C. current is illustrated by two wires 33 and 34, 33 being connected to the negative terminal and 34 to the positive terminal. The circuit includes wire 33, ammeter 18, variable resistance 17, wire 32, cathode 12, electrolyte, anode 14 and wire 34.

To protect metal from corrosion, the relative potential at the surface of the metal must be increased to trans-

2 pose the normal positive ionic surface state to an impressed negative ionic state. For example, a steel structure cathode has a potential of 630 millivolts with reference to a silver-silver chloride electrode. It is known that to protect the ship's hull, made of steel, from corrosion in sea water, a potential must exist of approximately 890 millivolts, depending upon varying factors, and accordingly the potential of the steel cathode must be raised approximately 260 millivolts to prevent galvanic corrosion or dissolution of the metal, which corrosion or dissolution results in pitting. This is accomplished by subjecting the cathode to the electron flow in the external circuit. The variable resistance 17 is used to regulate the potential to that necessary for raising of the potential of the cathode.

As set forth in my co-pending application Serial Number 648,320, now abandoned, filed March 25, 1957, I have discovered that the potential of the entire surface of the cathode, for example the entire surface of the hull of a ship, can be maintained at a substantially uniform potential by interposing in the external circuit a resistance having a value greatly in excess of the resistance offered by the metal from that part of the metal most remote from the junction of wire 32 to the cathode to the metal at said junction plus the resistance offered by all of the electrolyte immediately adjacent the entire surface of the cathode contacted by the electrolyte.

The present invention makes it possible to produce high resistant coatings consisting of passive compounds which provide a relatively high resistance to current passage between the electrolyte and the surface of anode 14, thus creating in effect the high circuit resistance through this means to supplement the requirement of the added resistance employed in the above referred application Serial Number 648,320, now abandoned.

With respect to the reference electrode, I have shown the same at 54 which is connected with the cathode 12 by wire 56 and millivoltmeter 58.

Figure 2:
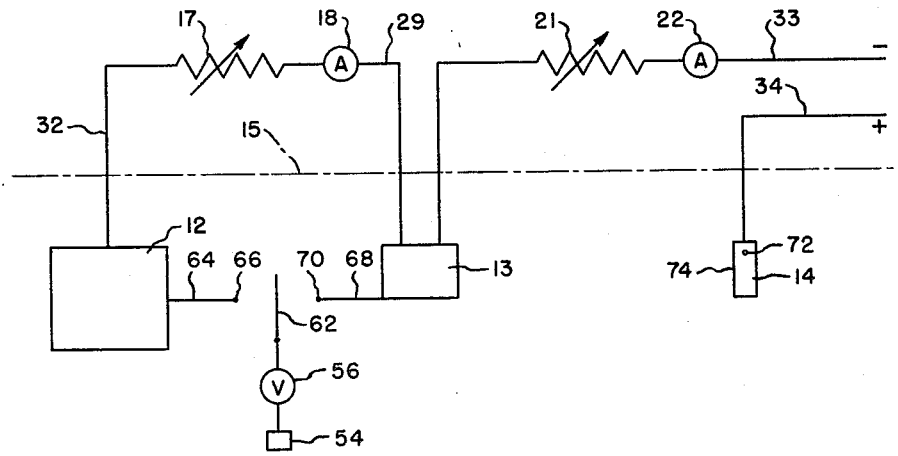
FIG. 2 is a diagrammatic view illustrating another galvanic system wherein my invention is employed.
Figure 3:
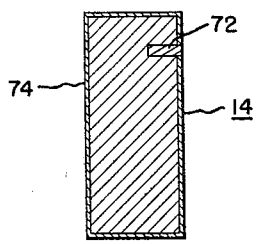
FIG. 3 is a longitudinal cross-sectional view of the improved anode.

It is desirable, from a safety factor standpoint especially for seagoing vessels, to employ a tri-electrode system such as that disclosed in my co-pending application Serial Number 586,969 filed May 24, 1956, now U.S. Patent No. 2,903,405, and herein shown as in FIG. 2. Here the third electrode is shown at 13 which may be sacrificial material such as magnesium alloy. In case of power failure of the circuit, the cathode will remain protected by the anodic material 13. The external circuit at that time will include wire 29, ammeter 18, variable resistance 17, and wire 32 to the cathode 12.

The circuit, employing an extraneous source of D.C. current, is substantially the same as in FIG. 1 and includes negative wire 33, ammeter 22, variable resistance 21, electrode 13, wire 29, ammeter 18, variable resistance 17, and wire 32 to cathode 12. The extraneous circuit is utilized also to impress the current on the cathode anode 13 to raise that electrode's potential from approximately 1490 millivolts, with respect to the millivoltmeter 58, to approximately 2105 millivolts, or above, the latter being the potential at which dissolution of the magnesium alloy does not take effect in sea water, and, simultaneously the extraneous circuit is utilized to impress current on the cathode 12 to raise its potential from normal level to desired optimum level with reference to the millivoltmeter 58. This is accomplished by regulating the variable resistance 21 or wattage control means which may be in the primary D.C. extraneous current supply circuit, and by regulating the variable resistance 17, which is interposed between the anode cathode 13 and the anode 12.

In this tri-electrode system, FIG. 2, the reference half-cell 54 and the millivoltmeter 56 can be selectively connected with either cathode 12 or cathode anode 13 by switch 62. The circuit including cathode 12 comprises wire 64, stationary contact 66, movable switch contact 62, millivoltmeter 56, and reference half-cell 54; the circuit including cathode anode 13 comprises wire 68, stationary contact 70, movable contact 62, millivoltmeter 56 and reference half-cell 54 of silver-silver chloride.

Some compounds, and a number of the elements, enter a passive state when they are functioning as an impressed current anode in certain electrolytes subject to required current density and time. That is, the surface coating material becomes more passive to the passage of electrons in the ion exchange phenomena. In certain of these elements or compounds the passivity thereof increases to such an extent that it substantially completely isolates the surface conductive of the electrode from the electrolyte environment. Such is true with respect to the metals aluminum, lead, and other metallic compounds.

I have discovered that by physically associating, with an anode 14 formed of lead, a small piece of relatively inert material such a platinum 72, passivity of the anode 14 is checked, i.e., the ionic exchange relationship is maintained between the lead and the electrolyte, yet there is no further dissolution of the lead after a certain stage of ionization is attained; this ionization is attained by the forming of a compound 74 due to the ionic relationship between the lead and the sea water. By the presence of the small plug of platinum, the forming of the compound stops at a stage in which the entire surface of the anode functions as such but without the dissolution of the lead.

Thus in effect the entire surface of the relatively inexpensive lead functions to perform substantially the same service as an equal area of the highly expensive platinum in that it is relatively inert, yet functions as an anode.

My observation has been that the entire surface of the anode functions as such since gases are evolved throughout this entire area, most of which gases as yet have not been identified but are not chlorine as would be the case if the entire surface of the anode was platinum.

After the coating has achieved its predetermined resistivity at a given voltage level, the electron flow between the electrolyte and the lead of the anode depends entirely upon the area of the platinum, of the anode, which is exposed to the electrolyte. Thus the present anode clearly distinguishes from an anode which for example would be an alloy of lead and platinum. In the instant case, the maximum electron flow at any predetermined voltage level can be governed by varying the size of the surface of the platinum exposed to the electrolyte, and the desired flow of current in the system can be regulated by regulating the impressed voltage between the predetermined maximum and 0 voltage. If a higher maximum value of current flow is desired, the surface area of the platinum exposed to the electrolyte is increased in the original design of the anode and conversely if a lower value of current is desired, the surface area of the platinum, exposed to the electrolyte, is decreased.

Thus, in effect, the platinum becomes an electron conducting window or orifice for the flow of electrons, through the wall of the anode into the metallic circuit of the cathodic system, and permits the ionic exchange phenomena to take place over the entire outer surface of the lead of the anode without further dissolution of the lead of the anode, thus providing a high surface ratio to be present between the anode and cathode at a minimum material cost of the anode.

While lead was specifically mentioned as the anode, such specification is merely exemplary as an illustration of an inexpensive material for use in preventing corrosion of iron or steel in sea water, it is to be understood that the same phenomena may prevail with respect to any substance, such as aluminum or tantalum, when used with such electrolytes, which have galvanic relationship therewith. Specifically the mass of platinum is only a fraction of a percent of the mass of the lead, and the surface of the platinum, which is exposed to the sea water, is only a fraction of the surface of the lead which is exposed to the sea water, yet the results achieved are the same as when all of the anode is formed entirely of platinum. Obviously I have materially reduced the cost of anodes, making it economically feasible to provide ample anode surface to provide efficient and uniform polarization results.

While the forms of embodiment herein shown and described constitute preferred forms, it is to be understood that other forms may be adopted falling within the scope of the claims that follow.

I claim:

1. A control system for preventing corrosion of a metallic structure which is subjected to sea water environment comprising in combination a source of direct current having the negative side thereof connected with the structure; an anode connected to the positive side of said source of current and subjected to the sea water environment, said anode consisting of a homogeneous metal which in its entirety is susceptible of becoming passive to current flow when so coupled with the positive side of the source of current and with the structure through the sea water environment, and after a certain stage of ionization is attained, said anode also consisting of means for maintaining anodical activeness of the entire surface of said metal which is exposed to the sea water environment, said means consisting of at least one plug of metal which will not dissolve in the commonly used acids and which is in intimate contact with the first mentioned metal of the anode and which has a surface exposed to the sea water environment.

2. A system as defined in claim 1, in which the first mentioned metal is lead.

3. A system as defined in claim 1, in which the second mentioned metal is platinum.

4. A system as defined in claim 1, in which the first mentioned metal is lead and the second mentioned metal is platinum.

5. A system as defined in claim 1, in which the second mentioned metal is only a fraction of a percent of the mass of the first mentioned metal.

6. A system as defined in claim 1, in which the first mentioned metal is lead and the second mentioned metal is only a fraction of a percent of the mass of lead.

7. A system as defined in claim 1, in which the second mentioned metal is platinum, and the platinum is only a fraction of a percent of the mass of the first mentioned metal.

8. A system as defined in claim 1, in which the first mentioned metal is lead and the second mentioned metal is platinum and the platinum is only a fraction of a percent of the mass of lead.

References Cited in the file of this patent

UNITED STATES PATENTS

| | | |
|---|---|---|
| 1,984,899 | Smith | Dec. 18, 1934 |
| 2,149,617 | Menaul | Mar. 7, 1939 |
| 2,546,548 | Koster | Mar. 27, 1951 |

OTHER REFERENCES

Cotton: "Platinum Metals Review," vol. 2, No. 2, pp. 45–47, April 1958.

Cotton: "Chemistry and Industry," April 26, 1958, pp. 492–93.